US007222788B2

(12) United States Patent
Wenger et al.

(10) Patent No.: US 7,222,788 B2
(45) Date of Patent: May 29, 2007

(54) METHOD FOR REGISTERING TICKETS AND ELECTRONIC TICKET

(75) Inventors: Bruno Wenger, Au/Zh (CH); Alfred Lauper, Zurich (CH)

(73) Assignee: Siemens VDO Automotive AG, Neuhausen a.R. (CH)

( * ) Notice: Subject to any disclaimer, the term of this patent is extended or adjusted under 35 U.S.C. 154(b) by 60 days.

(21) Appl. No.: 11/144,761

(22) Filed: Jun. 6, 2005

(65) Prior Publication Data

US 2006/0016889 A1 Jan. 26, 2006

(30) Foreign Application Priority Data

Jul. 24, 2004 (EP) .................................. 04017585

(51) Int. Cl.
*G06K 7/06* (2006.01)
*G07B 15/02* (2006.01)

(52) U.S. Cl. ........................ 235/441; 235/384; 235/492

(58) Field of Classification Search ................ 235/441, 235/487, 492, 384, 382, 462.45
See application file for complete search history.

(56) References Cited

U.S. PATENT DOCUMENTS 5,245,346 A 9/1993 Nishimura et al.
5,541,583 A * 7/1996 Mandelbaum ........... 340/10.51
5,621,200 A * 4/1997 Irwin et al. ................. 235/375
5,844,244 A * 12/1998 Graf et al. .................. 235/375
5,914,671 A * 6/1999 Tuttle ...................... 340/10.42
6,127,917 A * 10/2000 Tuttle ........................ 340/10.1
6,593,845 B1 7/2003 Friedman et al.
6,736,322 B2 * 5/2004 Gobburu et al. ....... 235/462.46
7,053,775 B2 * 5/2006 Moore ..................... 340/572.1

FOREIGN PATENT DOCUMENTS

EP 1 065 625 A 1/2001
WO WO 92/08148 A 5/1992
WO WO 01/20557 A 3/2001

OTHER PUBLICATIONS

Derwent Abstract—EP 1 065 625 A Jan. 3, 2001 EM Microelectronic-Marin SA.

* cited by examiner

*Primary Examiner*—Daniel Stcyr

(57) ABSTRACT

To minimise the power consumption when registering an electronic ticket, a bidirectional communication in a higher frequency band is initiated when the electronic ticket has received a wake-up signal in a lower frequency band via a highly sensitive receive module. During entry stamping, a wake-up telegram containing an identity of the detection space is transferred to and stored in the electronic ticket. The wake-up telegram is received in the lower frequency band by another receive module in the electronic ticket.

10 Claims, 3 Drawing Sheets

METHOD FOR REGISTERING TICKETS AND ELECTRONIC TICKET

BACKGROUND OF THE INVENTION

The present invention relates to a method for registering tickets and an electronic ticket for executing the method in accordance with the precharacterising clause of claims 1 and 8 respectively.

The present invention relates to the registration of objects in a delimited space, in order to establish a service which is to be purchased and/or a defined presence. This field is also known as "electronic ticketing" or "fare management". The term "electronic ticket" or simply "ticket" is synonymously used instead of object in this document. In technical terms, such a ticket is usually a so-called "SmartCard". In other nomenclatures, the term transponder is also commonly used instead of SmartCard.

The document WO 01/03057 A1 [1] discloses a method for detecting objects by means of a transponder, wherein a first information unit is transmitted in the frequency range 127 kHz to the transponder when a detection zone is entered, thereby waking up said transponder. On the basis of the information which is contained in the first information unit, a send module which is present on the transponder is activated immediately or following a delay, in order at least once to transmit a second information unit to a receive unit which is located in the detection zone.

The method and system for registering tickets as disclosed in the document EP 1,210,693 B1 [2] differ in that a receiving module which is present on the ticket is "woken up" from a sleep state by means of a first information unit and is periodically switched to active. Using further information units, a bidirectional communication is established on a higher frequency of e.g. 868 MHz by a send/receive unit which is assigned to the detection zone, and the relevant presence of a ticket is registered as a ticket record.

EP 0,766,215 B1 [3] proposes a method in which an electronic ticket can be woken up in various stages. A level detector is initially provided for this purpose, whereby only wake-up telegrams on a low frequency of e.g. 6.78 MHz of a defined minimum level result in a first activation. In a subsequent method step, provision is made for checking whether the received wake-up telegram has the predetermined modulation. If this modulation is recognised as correct, a further circuit part is activated and inter alia the correspondence of an access code with a security code which is stored on the ticket is checked on a higher layer.

The aforementioned systems, as described in accordance with [1] and [2], have the so-called "timing mode" in common: as a result of waking up and periodically activating either the send module and/or receive module which is located on the ticket, the power consumption is actually reduced very clearly in comparison with a permanent activation. In many cases, the ticket is woken up in this way without a subsequent registration taking place or being allowed to take place, as is the case when an accompanying person who is carrying such a ticket merely stays on the platform. The "timing mode" method featuring a single prior wake-up has the serious disadvantage that a significant share if not the largest share of the battery power which is available on the ticket must be used in order to ensure that, during the overall journey, the ticket periodically becomes briefly active ("wakes up") in the agreed time slot pattern and must switch on its receiver, e.g. on the frequency 868 MHz, merely for the purpose of re-establishing its synchronisation. In this case, a communication for the purpose of actual detection takes place only very briefly and preferably only once per journey section.

SUMMARY OF THE INVENTION

The present invention therefore addresses the problem of specifying a method for the registration of tickets and an electronic ticket for carrying out the method, wherein the power consumption is further minimised and wherein the bidirectional communication using the "timing mode" method takes place in such a way that the associated receivers need only be switched into ready-to-receive state as briefly as possible.

One aspect in accordance with the present invention is a method of bidirectional communication using telegrams in a second frequency band which is initiated by means of a wake-up signal in a first frequency band. The wake-up signal is received beforehand by a second receive module which is contained in the ticket. The activation of the send/receive module and hence also of the processor module can be limited to those cases in which a telegram really must reach the ticket concerned. The power requirement of the ticket is consequently minimised, thereby significantly increasing the autonomy.

This invention has the particular advantage that, within the detection space, no adaptation of the send units and other infrastructure such as on-board computer is required with regard to hardware. Only the software for controlling the first send unit 31 and the second send/receive unit 32 needs to be adapted. To a significant extent, parts of the communication software on the second frequency band can be transferred almost unchanged in this way.

In one advantageous aspect of an electronic ticket according to the invention, a second receive module is provided in the first frequency band. The second receive module has a higher receive sensitivity and is able to receive at least one wakeup signal. The activation of the send/receive module on the ticket, and of the processor module, can be limited to those cases in which a telegram really must reach the ticket concerned.

In a particularly advantageous embodiment, provision can be made to connect a passive filter or a demodulator in front of the second receive module, so that this space wake-up does not occur due to any random carrier as a result of the high sensitivity of the second receive module, but only occurs if the wake-up signal has a defined modulation, e.g. frequency modulation or amplitude modulation (envelope).

BRIEF DESCRIPTION OF THE SEVERAL VIEWS OF THE DRAWINGS

Advantageous configurations of the invention are specified in further claims.

Exemplary embodiments of the invention are explained in greater detail below with reference to the drawing, in which.

DETAILED DESCRIPTION OF THE INVENTION

Figure 1:
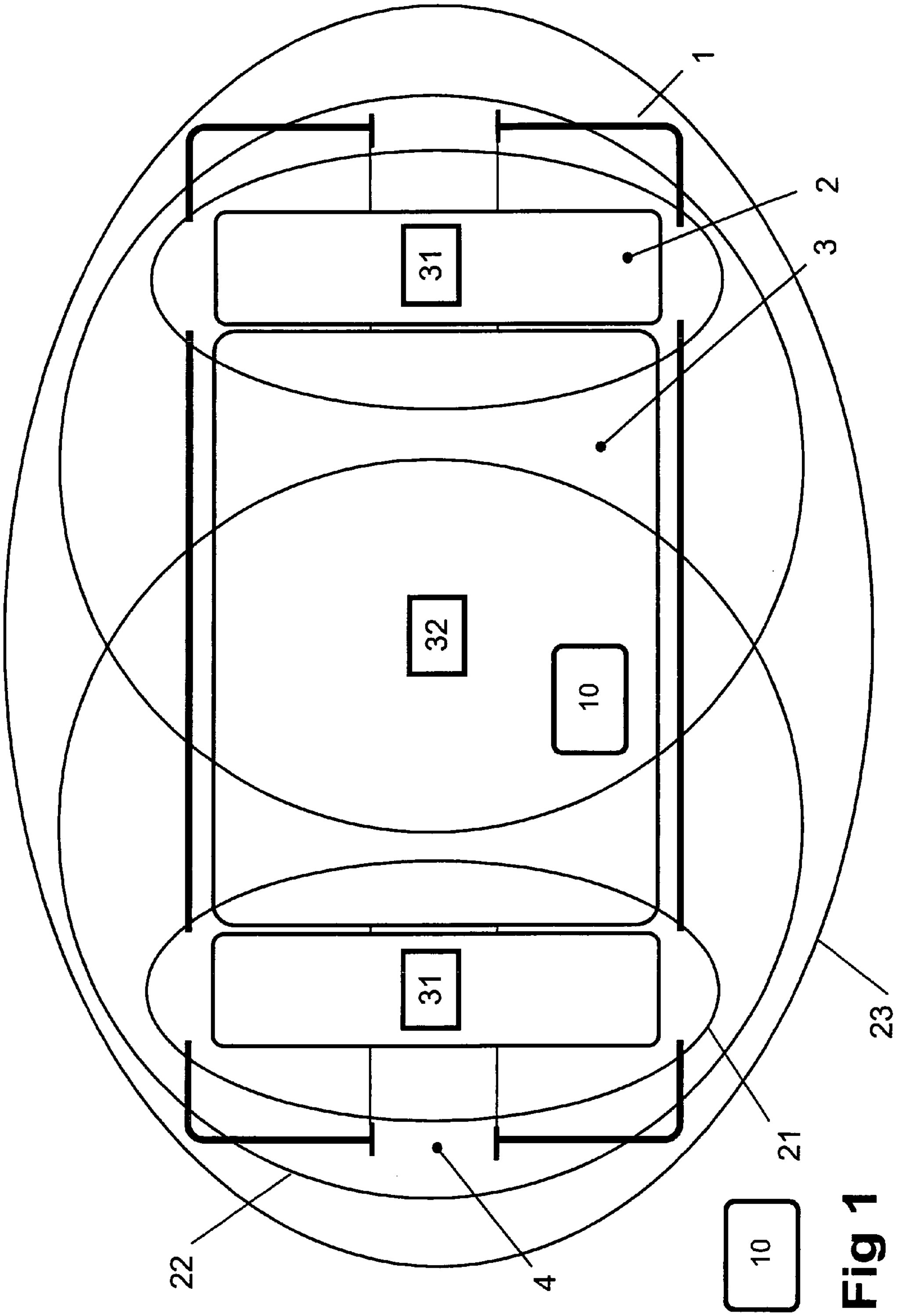
FIG. 1 shows an arrangement of the sender/receiver unit on the vehicle, together with the associated zones.

FIG. 1 shows a railway carriage 1. Its passenger space 3 can be accessed by the public via an entrance area 2 through the doors or through a passage area 4. A first send unit 31 is arranged in the relevant entrance area 2. This send unit 31 works on a first frequency band, preferably at 6.78 MHz. The frequency of the first frequency band is selected in such a way that the resulting field is developed within a circumcircle of up to 7 m as a "near field". Near field means that the H field is dominant in this case. The near field is usually defined as $r<\lambda \cdot 0.6$, where $\lambda$ represents the wavelength. Within the near area, the magnetic field strength H decreases rapidly with the cube of the distance from the sender. It is therefore possible to achieve a circle of influence which is defined and limited in a spatially narrow manner.

A second send/receive unit 32 is arranged preferably centrally in the passenger space 3. It is also possible to arrange e.g. a plurality of such send/receive units 32 in larger vehicles. The second frequency band, which is provided for the bidirectional communication with the tickets 10, is clearly higher than the aforementioned first frequency band, and a frequency of 868 MHz is preferably used. The frequency band around 868 MHz has particularly good propagation properties within a vehicle.

Figure 3:
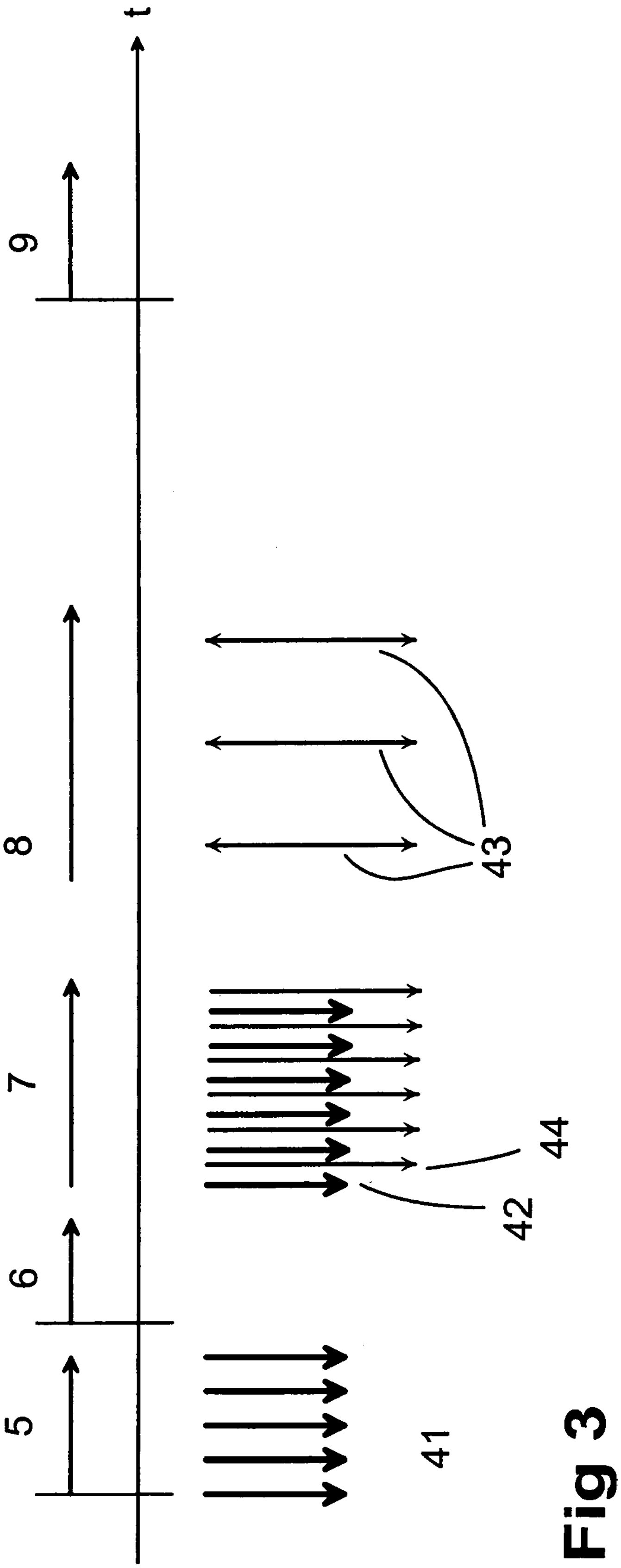
FIG. 3 shows the sequence of the different phases.

The sequence of the method according to the invention is illustrated in FIG. 3, in which the letters A, B, B1 relate to the method steps in accordance with the claim 1:

A When boarding, i.e. when a ticket 10 moves from a sleep state into the entry wake-up zone 21 in the halted state 5 of a vehicle 1, the ticket 10 is woken up via a level in the first frequency band of 6.78 MHz and given the required information such as an identity of the detection zone, location of the vehicle and the time. This phase is also called "entry stamping". The tickets 10 which have been "stamped" in this way then revert to a sleep state. The area which is designated by the reference character 21 in accordance with the FIG. 1 is defined by a minimum level, so that the tickets 10 can be woken up and given the aforementioned information in this area 21.

B1 Following departure or following the beginning of a service purchase, the space wake-up 7 takes place. For this, a space wake-up signal 42 is broadcast by the first send unit 31 and immediately afterwards, or even simultaneously, a telegram 44 is repeatedly broadcast via the second send/receive unit 32. The telegram 44 contains at least the identity and the timing information for the subsequent detection in the "timing mode". The area which is identified by means of the reference character 22 in the FIG. 1 is defined by a minimal level, such that the tickets 10 in this area 22 are "woken up" by a signal 42 having a specific modulation. An information transmission on a higher layer does not take place on the first frequency band in this case, unlike entry stamping, cf. the method step A above. Instead, the necessary information is transmitted simultaneously or immediately afterwards on the second frequency band using the telegrams 44.

B Following this space wake-up 7, B1 the tickets are in "timing mode" with a time slot pattern as described in EP 1,210,693 B1 [2], for example. Now the actual detection 8 can take place via the second frequency band.

After detection is complete 8, B the tickets 10 switch directly to the sleep state 9. In a subsequent journey section, e.g. following a halt and any passenger boarding or disembarking, the aforementioned space wake-up 7, B1 and subsequent detection 8, B take place again.

Figure 2:
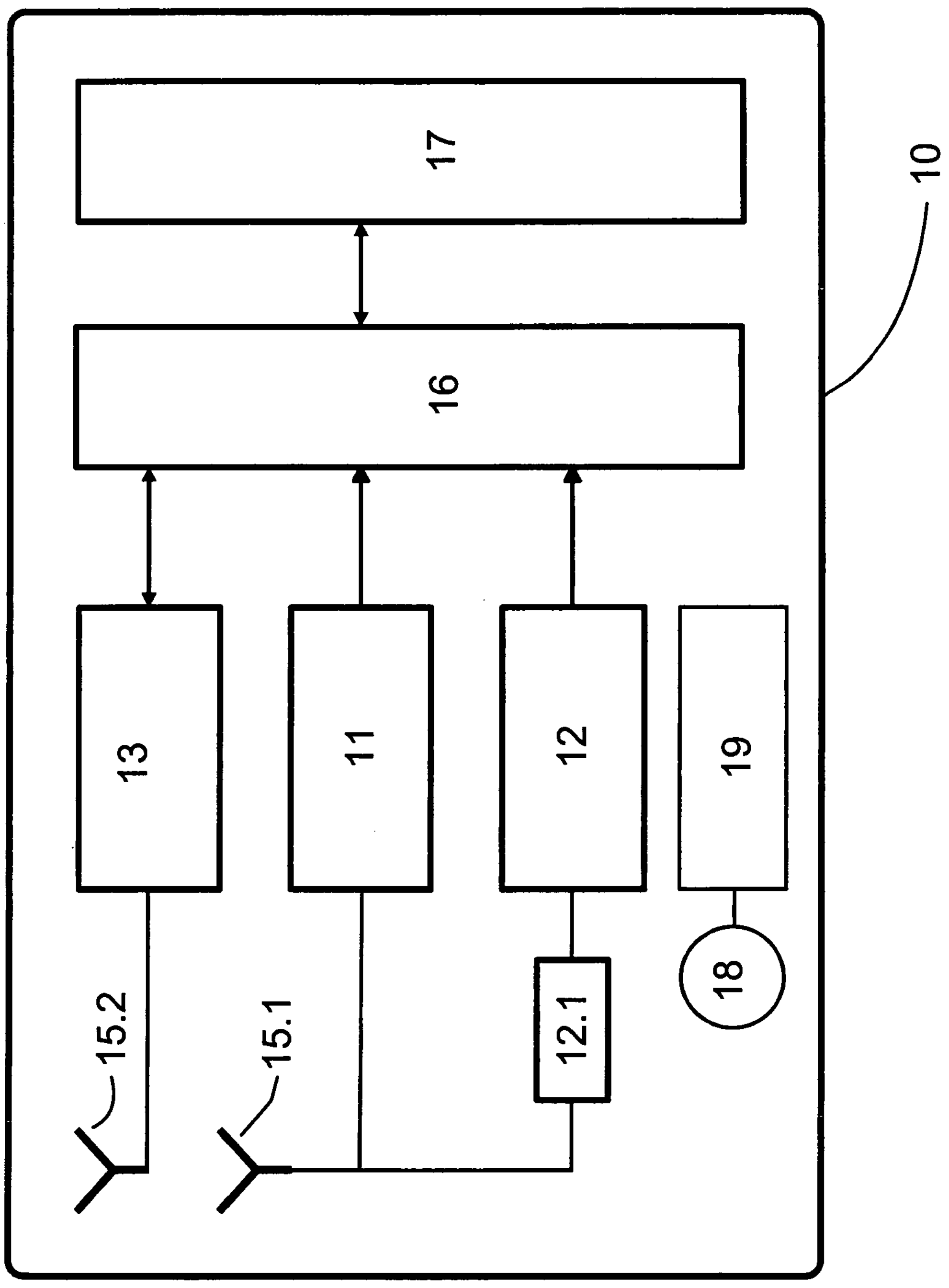
FIG. 2 shows a schematic circuit diagram of an electronic ticket for carrying out the claimed method.

In a further embodiment of the present invention, provision can be made for an additional method step A1:

Reference is now made to the FIG. 2 for an electronic ticket 10 for carrying out the aforementioned method in accordance with the invention: For the space wake-up 7, the ticket 10 must include a second, highly sensitive and extremely low-current receive module 12—also called a wake-up receiver 12—for 6.78 MHz. This wake-up receiver 12—like the existing first receive module 11—works in a sampled mode in order to save electrical power. Its on/off duty cycle can be even more extreme than in the case of the first one, e.g. 100 times greater. The second wake-up receiver 12 must be a certain amount more sensitive than the first receive module 11, e.g. by 20 dB. However, the wake-up receiver 12 does not have to receive any data. It merely samples the air for the presence of a 6.78-MHz carrier signal. In order to ensure that it does not respond to any alien 6.78-MHz signal that might be randomly present, a passive filter 12.1—also called a demodulator—can be connected in series, said passive filter allowing only those signals to pass which are, for example, modulated at a suitable frequency. If such a signal 42 is detected, the processor 16 is woken up and the 868-MHz receiver 13 is activated for a certain amount of time on the ticket 10. The ticket 10 then receives a continuously repeated signal from the send/receive unit 32, said signal containing timing information and a reader ID which corresponds to that which the ticket properly received via a correct wake-up telegram and saved previously in this vehicle at the time of boarding, i.e. at the time of the entry stamping 5. If this is the case, the ticket now switches into the "timing mode". Otherwise, it returns to the sleep state. However, it must first remain for several seconds in a power-saving wait state, because it would otherwise be immediately woken up again by the alien 6.78-MHz signal which might still be present, and would activate its receive module 12 again. A duty cycle principle for power saving is again produced using this method. This wait time should be, for example, 10 times longer than the time for which the ticket 10 would again activate its receive module 12.

For the sake of completeness, FIG. 2 also includes the antennas 15.1 and 15.2, a power supply module 18 and a battery 19, as well as a processor module 16 and a memory module 17 for implementing the required intelligence. For the purpose of optimisation, a single antenna 15.1 is provided for the first and second receive module 11 and 12. The illustration of the antennas 15.1 and 15.2 is only schematic, and the antennas are obviously adapted to the range of 6.78 MHz or 868 MHz in accordance with the intended frequency bands.

As a result of applying a maximal permitted send level and a significantly higher receive sensitivity of the second receive module 12 on the ticket 10, it is possible to achieve a considerably higher transmission range 22 than the customary transmission range 21 which is intentionally restricted to 3 m for the normal wake-up. Consequently, there is no requirement for additional space wake-up antennas in the vehicle 1.

Within the meaning of the present invention, it is also possible to implement different frequencies from the same first frequency band for the so-called entry stamping in the method step A and the space wake-up in the method step B1. In order to reduce the complexity of the components which are used, however, it is advantageous to provide the identical frequency for the entry stamping and the space wake-up.

The invention is in no way restricted to the application in a vehicle such as a railway carriage or bus, but can be applied anywhere where electronic tickets for detecting a defined presence require a particularly high level of autonomy.

Autonomy in this context means that, for as long as possible, there is no need to replace a battery or perform any other maintenance intervention in relation to power supply or interoperability. Examples of other applications are: access systems, position-fixing systems for people and goods.

The aforementioned variants of the different method steps can be freely combined and, in particular, a ticket 10 can return to the sleep state 9 after a detection has taken place in the timing mode, and then be activated again by means of space wake-up.

What is claimed is:

1. A method for registering tickets for the purpose of establishing a service which is purchased and/or a defined presence, wherein at least one first send unit on a first frequency band and one send/receive unit on a second frequency band for communicating with tickets are provided in a detection zone, and wherein the detection zone is assigned at least one entry zone via which the detection zone can be entered and exited, comprising:

receiving in a ticket passing into the entry zone a first information unit via a first receive module in the ticket from the first send unit on the first frequency band, the first information unit containing an identity which is assigned to the detection zones, the first information unit being stored on the ticket after receipt;

receiving a wake-up signal on the first frequency band by a second receive module in the ticket when situated in the detection zone at a time point which is determined by the beginning of the service that is to be purchased and/or of the defined presence; and intermittently activating a send/receive module in the ticket in response to the wake-up signal to initiate a bidirectional communication between the send/receive unit and the send/receive module by telegrams in the second frequency band to register the relevant presence of the ticket in the detection zone at least once.

2. The method according to claim 1, wherein the second receive module in the ticket is intermittently switched to active in the ticket as a result of receiving the first information unit by the first receive module.

3. The method according to claim 1, wherein the wake-up signal is frequency-modulated or amplitude-modulated.

4. The method according to claim 1, further comprising transmitting a telegram for the Intermittent active switching of the send/receive module to be transmitted in the second frequency band after or at the same time as the wake-up signal transmitted on the first frequency band.

5. The method according to claim 1, wherein the wake-up signal is received and the bidirectional communication between the send/receive unit and the send/receive module is reiterated for each ticket within the detection zone until all tickets within the detection zone have been registered.

6. The method according to claim 1, wherein a frequency on which the first information unit is received by the first receive module on the first frequency band and a frequency on which the wake-up, signal is received by the second receive module on the first frequency band are identical.

7. The method according to claim 1, wherein the ticket switches to a sleep state after registering the presence of the ticket in the detection zone.

8. An electronic ticket comprising:

a first receive module in a first frequency band, the first receive module having a first receive sensitivity, the first receive module receiving wake-up telegrams having content to be stored on the ticket;

a second receive module in the first frequency band, the second receive module having a second receive sensitivity higher than the first receive sensitivity, the second receive module receiving a least one wake-up signal;

a send/receive module in a second frequency band, the second frequency band having frequencies higher than frequencies in the first frequency band, the send/receive module being selectively activated in response to the at least one wake-up signal received by the second receive module.

9. The ticket according to claim 8, wherein a filter is connected upstream of the second receive module so that only signals having a predetermined modulation are forwarded.

10. The ticket according to claim 9, wherein the predetermined modulation is a frequency modulation or an amplitude modulation.

* * * * *